(12) United States Patent
Chen et al.

(10) Patent No.: US 8,749,769 B2
(45) Date of Patent: Jun. 10, 2014

(54) MEDIA STRESS ANALYSIS SYSTEM AND METHOD

(75) Inventors: David Zhi Chen, Richardson, TX (US); George N. Bell, Stormville, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 558 days.

(21) Appl. No.: 12/826,024

(22) Filed: Jun. 29, 2010

(65) Prior Publication Data

US 2011/0317151 A1     Dec. 29, 2011

(51) Int. Cl.
*G01N 21/00*     (2006.01)

(52) U.S. Cl.
USPC ............... 356/73.1; 398/17; 398/25

(58) Field of Classification Search
USPC ........................ 356/73.1; 398/9–38
See application file for complete search history.

(56) References Cited

U.S. PATENT DOCUMENTS

| | | | |
|---|---|---|---|
| 5,673,351 A * | 9/1997 | Clarke et al. ................. | 385/100 |
| 2002/0180954 A1 * | 12/2002 | Qian et al. ................... | 356/73.1 |

\* cited by examiner

*Primary Examiner* — Tara S Pajoohi Gomez

(57) ABSTRACT

A method and system for determining stress associated with a communication device, e.g., an optical fiber, and associated structures are disclosed. An exemplary method includes transmitting an initiated signal through a communication device, and comparing a reflected signal reflected by the communication device with the initiated signal. The method may further include determining a stress associated with the device from at least the comparison of the initiated signal and the reflected signal.

22 Claims, 5 Drawing Sheets

MEDIA STRESS ANALYSIS SYSTEM AND METHOD

BACKGROUND

Communication media such as optical media have historically been fragile and susceptible to significant signal transmission loss when the media is bent, pinched, twisted, or subjected to environmental factors such as heat, moisture, etc. Accordingly, communication systems have generally been designed with these drawbacks in mind, minimizing sharp bends or exposure to environmental factors.

In recent years many significant advances have been made in the durability of these communication media. For example, various types of bend-insensitive fibers that are capable of low transmission losses even when severely bent or pinched are now employed in communication systems. Accordingly, the durability of communication systems is correspondingly greater as compared with previous systems that relied upon fibers or media that is more sensitive to bending.

Now that communication media can resist further bending without significant signal degradation, it is difficult to determine when the communication media are experiencing significant stress in the field short of total signal loss. Often the first indication that a communication media is under increasing duress is a total loss of the signal upon breakage of the media. By comparison, bend-sensitive fibers generally provide a more gradual attenuation in the transmitted signal that can be more easily detected by system monitors before any significant damage to the media occurs.

Accordingly, there is a need for an improved system stress monitoring system and method that maintains the durability benefits of bend-insensitive fiber while providing an indication of stress issues in the media prior to complete failure or breakage of the media.

BRIEF DESCRIPTION OF THE DRAWINGS

While the claims are not limited to the illustrated examples, an appreciation of various aspects is best gained through a discussion of various examples thereof. Referring now to the drawings, illustrative examples are shown in detail. Although the drawings represent the various examples, the drawings are not necessarily to scale and certain features may be exaggerated to better illustrate and explain an innovative aspect of an example. Further, the examples described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Various exemplary illustrations of methods and systems for determining stress associated with a communication device, e.g., an optical fiber, and associated structures are disclosed. An exemplary method may include transmitting an initiated signal through a communication device, and comparing a reflected signal reflected by the communication device with the initiated signal. The method may further include determining a stress associated with the device from at least the comparison of the initiated signal and the reflected signal.

An exemplary system includes a signal transmitter in communication with a communication device, the transmitter configured to initiate a signal through the communication device. The exemplary system may further include a receiver in communication with the communication device that is configured to receive a reflected signal from the communication device, and a monitor configured to compare the initiated signal and the reflected signal to determine a stress associated with the device. The stress may be determined according to at least a frequency shift associated with the initiated signal and the reflected signal.

Figure 1:
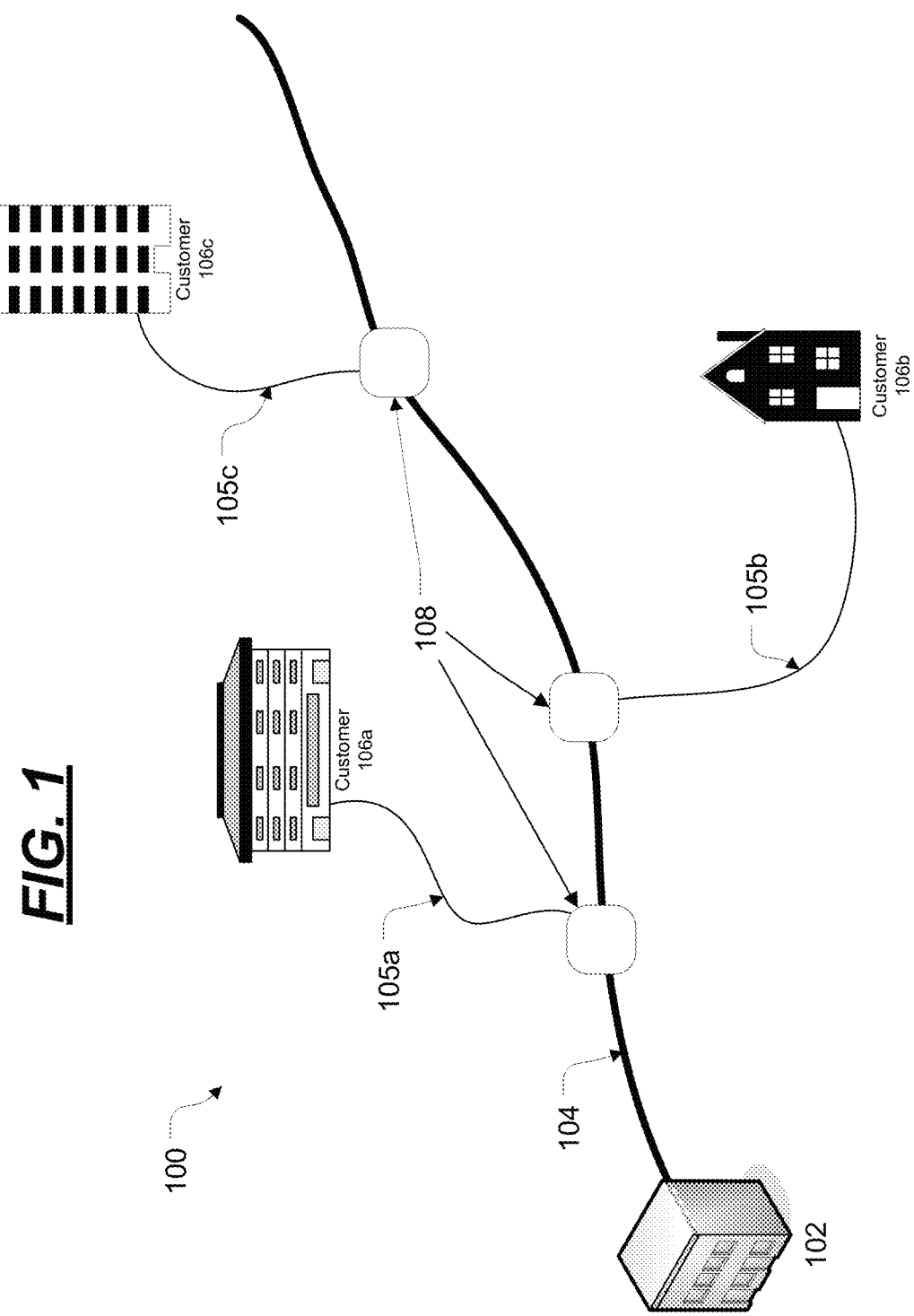
FIG. 1 illustrates an exemplary architecture of a communication system.

Turning now to FIG. 1, an exemplary communication system 100 is illustrated. The system 100 generally includes a central office 102 and a communication line or media 104 that provides communication signals to a plurality of customers 106. The communication media 104 may include any media configured to transmit data. In some exemplary illustrations, the communication media 104 includes optical fiber, as will be described further below. The system 100 may be in further communication with additional communications networks and/or systems (not shown), e.g., any known types of media distribution networks, packet-switched networks, telephone networks, or the like.

The system 100 may further include a plurality of media junctions or component assemblies 108 associated with a plurality of customer premises 106. Each component assembly 108 generally processes a signal transmitted through the communication media 104 to provide a desired signal, e.g., optical signals, media content, or the like, to/from an associated customer premise 106 via a customer-specific communication media 105. Where the system 100 includes fiber optic components or media, the component assembly 108 may include any component that is convenient for generally processing optical signals transmitted through the communication media 104 to customer(s) 106. For example, component assembly 108 may include a wavelength division multiplexing filter that is operable to generally receive an optical signal or data stream from communication line 104 and decode, i.e., demultiplex, the data stream to provide desired data, media content, etc., to a customer premise 106 associated with the component assembly 108 via the communication media 105. Central office 102 may thereby transmit multiple data streams to a plurality of customers at a single time.

As described above, in some exemplary illustrations the communication media 104 and/or communication media 105 may include optical media line in the form of optical fibers. Exemplary optical fibers may include photonic crystal fiber, also known as "hole assisted" or "bend-insensitive" fibers, which transmit signals through a spatially varying glass composition that includes air voids distributed throughout the fiber material, which generally comprises a crystal lattice structure. Hole-assisted fibers are generally resistant to signal transmission loss during bending of the fiber.

Another exemplary optical fiber is a "single mode" fiber, which generally supports transmission of an optical signal in a single direction along the fiber. More specifically, a single mode fiber may allow a single propagation mode per polarization direction for a given wavelength. Single mode fibers generally provide relatively low signal transmission loss along the communication media 104, but may also be generally sensitive to transmission loss and damage when the media 104 is bent, for example where the communication media 104 is connected to another component, or in transitions in the path of the communication media 104. While the bend-insensitive fibers generally offer superior bending properties relative to single-mode fibers, single-mode fibers may nonetheless be employed in system 100, e.g., in areas where bending of the fiber or other environmental factors that would otherwise damage the fiber are not a concern.

Where communication media 104, 105 include a crystal or lattice structure, e.g., bend-insensitive optical fibers, significant stress or strain of the fibers may generally cause deformation in the media structure. The deformation of the structure generally may scatter portions of a signal, e.g., light or optical signals, transmitted through the media. In one exemplary illustration, stress that causes an inelastic deformation in the fiber structure results in Brillouin scattering of an optical signal about the deformed portion of the fiber structure.

In one exemplary illustration, an incident component of an optical signal, e.g., a photon, is converted into two components. The first component is a scattered or reflected photon of slightly lower energy that typically propagates in a direction opposite the incident optical signal. The second component is an acoustic component or phonon. The frequency of the reflected photon may be slightly lower than that of the initiated or incident photon. A Brillouin frequency difference or shift $v_B$ between the incident beam and reflected beam corresponds to the frequency of emitted phonons. The Brillouin shift can generally be calculated from a refractive index n, acoustic velocity $v_a$, and vacuum wavelength $\lambda$ associated with the media 104, 105, according to the following equation:

$$v_B = \frac{2nv_a}{\lambda}$$

For Brillouin scattering in fibers, the effective refractive index may be employed.

Accordingly, an observed Brillouin frequency shift generally depends in part upon a material composition and to some extent the temperature and pressure of the media 104, 105. In one exemplary illustration, the Brillouin frequency shift is on the order of 10-20 GHz in a silica fiber. Different types of media employed in system 100 may also have different mechanical stress tolerances. The various media types may be further differentiated in this respect by a coating, glass structure, and/or index profile design associated with the media 104, 105.

Figure 2:
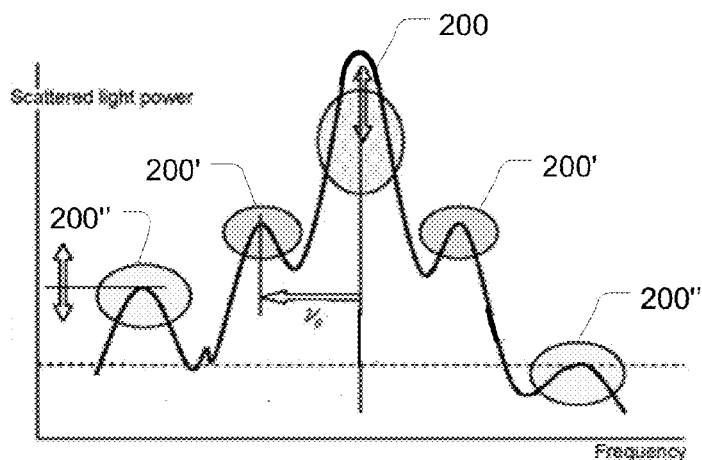
FIG. 2 illustrates a graph of an initiated signal defining a frequency shift.

Turning now to FIG. 2, an exemplary Brillouin frequency shift $v_B$ is illustrated in a representation of the scattered light power of an incident optical signal 200 transmitted through media 104, 105 at a given frequency $\omega_0$. As shown in FIG. 2, the Brillouin shift $v_B$ of the signal 200 is the frequency difference between the baseline frequency $\omega_0$ and the Brillouin scattered portion 200' of the incident signal 200. A second scattered portion 200", known as Raman scattered light, is shifted from the baseline frequency $\omega_0$ by a greater magnitude than the Brillouin scattered portion 200'.

Brillouin frequency shifts may be measured in media 104, 105, thereby providing an indication of stress or strain in the media 104, 105. Further, a Brillouin frequency shift may generally be observed at stress or strain levels in the media 104, 105 that still allow the media 104, 105 to transmit an optical signal. In other words, observations of a Brillouin frequency shift in media 104, 105 may provide a warning regarding increasing stress or strain levels in media 104, 105 before a significant loss in signal transmission capability of the media 104, 105. Changes in observed Brillouin frequency shifts may thus provide an early warning of increasing stresses upon media 104, 105 before the stresses cause significant transmission issues.

Figure 3:
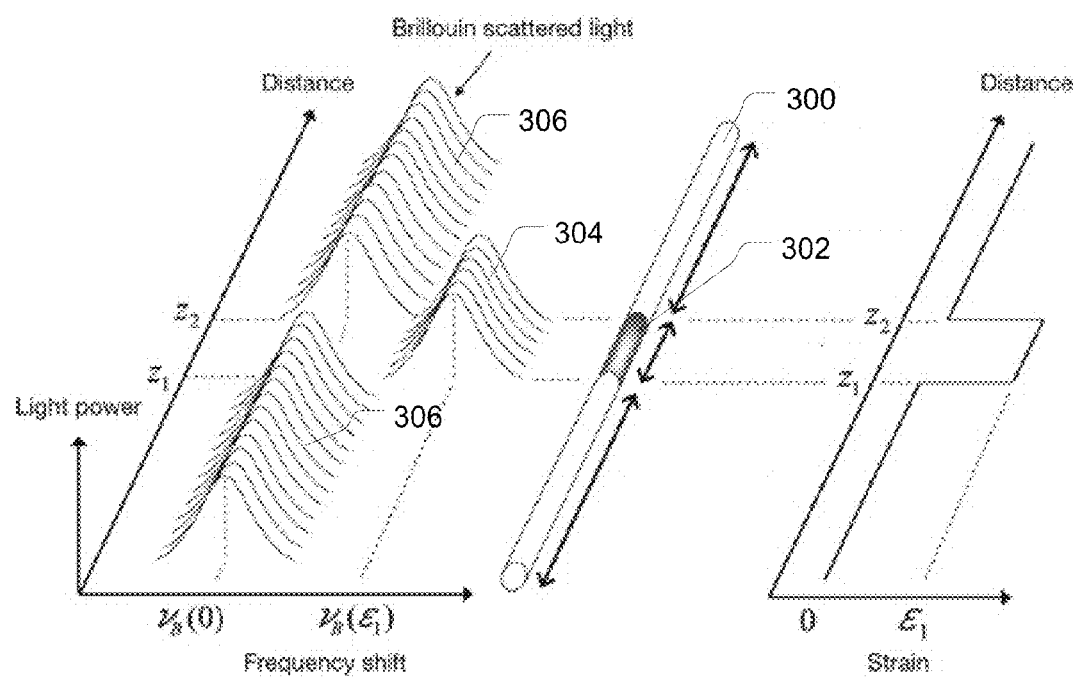
FIG. 3. illustrates an exemplary communication device defining a difference in a frequency shift along the length of the device as a result of a stress impinging upon a portion of the device.

Turning now to FIG. 3, an exemplary illustration of a Brillouin shift observed in a communication device, e.g., media 104, 105, is shown. A length 300 of an exemplary media 104, 105 is shown having a portion 302 experiencing an increased stress or strain resulting in an inelastic deformation of the material comprising the portion 302. For example, a severe pinching of the portion 302 may cause increased localized stress within the portion 302. The increased localized stress within portion 302 results in a frequency difference between a first Brillouin scattered light portion 304 that is associated with the strained portion, and a second Brillouin scattered light portion 306 that is associated with the non-stressed portions of the length 300. As shown in FIG. 3, the difference in Brillouin scattered light portions also marks a beginning point $z_1$ and end point $z_2$ of the strained portion 302 within the length 300. As will be described further below, a position of the localized stress within the length 300 may be determined according to the observed change in Brillouin frequency shift along the length 300.

Figure 4:
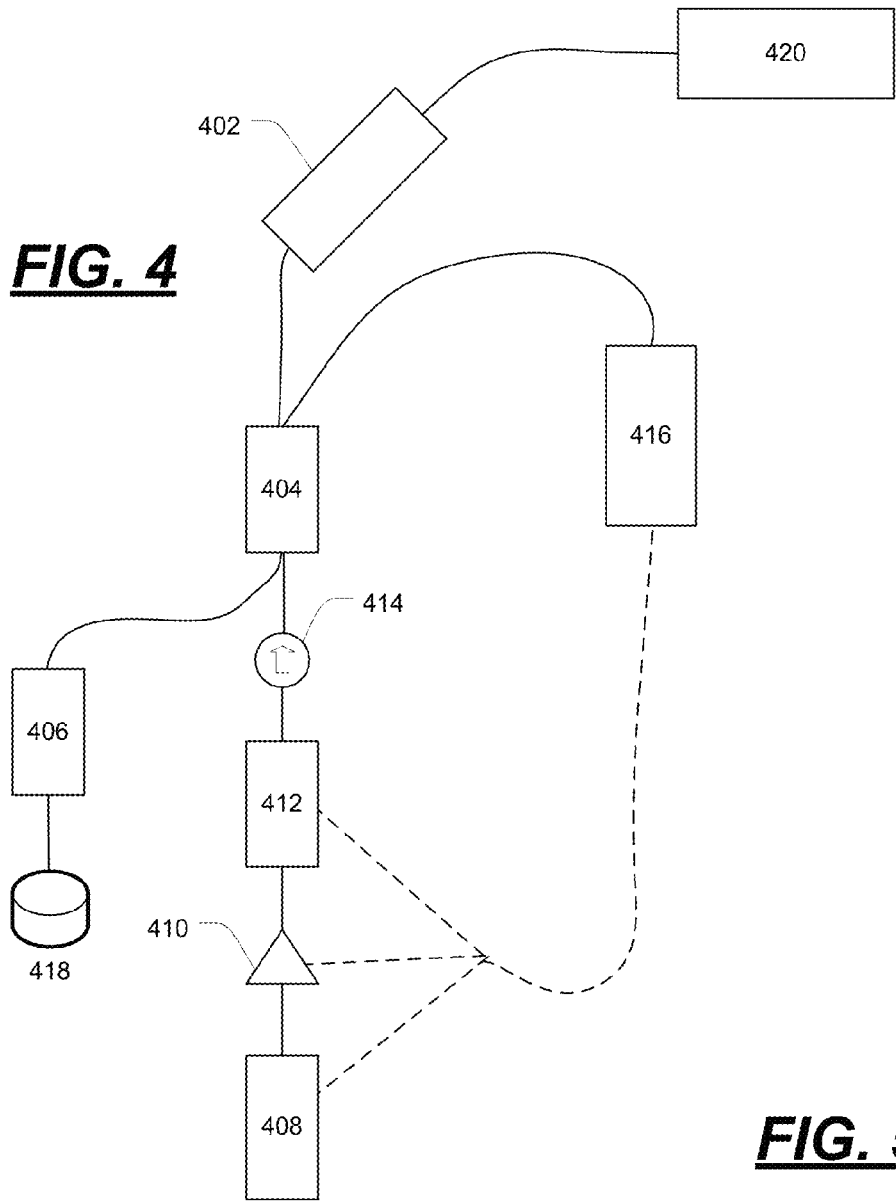
FIG. 4 illustrates an exemplary test apparatus for determining a stress associated with a communication device.

Turning now to FIG. 4, an exemplary test system or apparatus 400 for measuring Brillouin scattering in a device under test (DUT) 402, e.g., a length 300 of a communication media 104, 105, is shown. For example, DUT 402 may be a length of bend-insensitive optical fiber 402a.

The test apparatus 400 may include a splitter 404 that is configured to split an initiated signal, e.g., an optical signal, between the DUT 402 and a monitor 416, as will be described further below. Additionally, the splitter 404 may be in communication with a receiver 406 that is configured to determine Brillouin scattering present within the DUT 402, as will be described further below.

The test apparatus 400 may initiate a signal with a tunable signal generator 408. The signal generator 408 may be configured to initiate an optical signal, e.g., signal 200 in the DUT 402, and may also be configured to adjust a frequency of the initiated optical signal. In one example, the signal generator 408 is a frequency-adjustable laser configured to generate optical signals at different wavelengths within the DUT 402. An optical amplifier 410 and variable optical attenuator 412 may also be provided to amplify and attenuate a magnitude or power level of the generated optical signal, respectively.

An optical isolator 414 may also be disposed between the signal generator 408 and then DUT 402, e.g., between the attenuator 412 and the splitter 404 as illustrated in FIG. 4, thereby preventing reflected signals from being transmitted back toward the signal generator 408. The optical isolator 414 may thus generally serve as a "one-way valve" with respect to signals generated by the signal generator 408 and transmitted through the DUT 402.

The test apparatus 400 may also include an optical monitor 416 configured to monitor signals transmitted to the DUT 402 and adjust a wavelength of a signal initiated by the signal generator 408. The monitor 416 may be further configured to adjust an amplification or attenuation effect applied by the optical amplifier 410 and optical attenuator 412, respectively. A power monitor 420 may also be included in the test apparatus 400. Power monitor 420 may be configured to receive the initiated signal transmitted through the DUT 402, e.g., to measure any losses resulting from the transmission of the signal through the DUT 402.

Receiver 406 generally receives a reflected portion of the initiated signal transmitted to the DUT 402. Accordingly, the receiver 406 may generally be configured to determine a Brillouin scattering of the signal transmitted within the DUT 402, and corresponding stresses associated with the DUT 402. For example, receiver 406 may be in communication with a database 418 that includes data for a variety of communication devices, e.g., various types of media 104, 105 such as optical fibers, and corresponding Brillouin shifts observed in the media under predetermined stress or strain levels.

Computing devices in various embodiments such as receiver 406, monitor 416, and/or database 418 may each include instructions executable by one or more computing devices such as those listed above. Such instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any tangible medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of tangible computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, as described hereinafter, or any other medium from which a computer can read.

The test apparatus 400 may, in some exemplary illustrations, include an Optical Time Domain Reflectometer (OTDR) (not shown) configured to measure Brillouin scattering occurring in DUT 402. More specifically, an OTDR may be configured to initiate a signal, e.g., an optical signal, in the DUT 402 and measure Brillouin scattering. Generally, an OTDR may analyze losses, including Brillouin scattering, in an optical fiber. An OTDR may pulse a laser into DUT 402 and measure returning pulses of backscatter and reflection of light as a function of time. As the transmitted light returns to the OTDR, the light is analyzed to determine a location for losses, e.g., Brillouin scattering, or defects in the fiber due to breaks, damage, or ineffective splices. Moreover, the intensity of light returned and any scattering, e.g., Brillouin scattering, may be analyzed as a function of time and/or distance generally described above.

Figure 5:
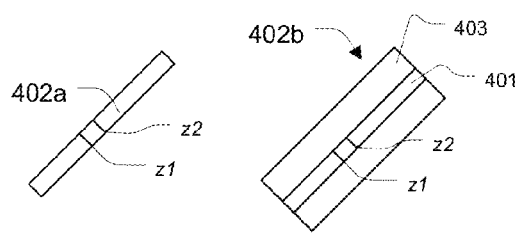
FIG. 5 illustrates variations of exemplary communication devices.

The DUT 402 may generally be any transmissive element or communication device capable of transmitting a signal and a reflected portion that allows determining a stress or strain in the element. For example, as generally described above in FIG. 4, and as shown in further detail in FIG. 5, DUT 402 may be an optical fiber 402a having a region of localized stress extending between two end points z1, z2 within the fiber 402a.

In another exemplary illustration, the DUT 402 may be an optical fiber assembly 402b that includes a structure or housing 403. A fiber portion 401 extends within the housing 403 and is configured to transmit a signal, e.g., optical signals as described above. Localized stress in a region extending between endpoints z1, z2 within the fiber 401 may be caused by stress from the housing 403. In other words, a localized stress resulting in a shift in Brillouin scattering may be caused by a structural problem or increased stress with the housing 403.

Accordingly, the exemplary illustrations described herein may be employed not only for diagnosing potential transmission problems in a communication system, but also for diagnosing potential structural problems in elements through which a fiber 401 extends. For example, by installing a fiber 401 within a structural member of a building, e.g., a concrete foundation, potential structural problems may be diagnosed according to periodic evaluations of Brillouin scattering observed in the fiber 401. The fiber 401 may be installed in virtually any structure that is convenient. These examples may also be useful where internal stresses of the structure are not easily monitored due to a location of the structure, e.g., deep sea structures.

Figure 6:
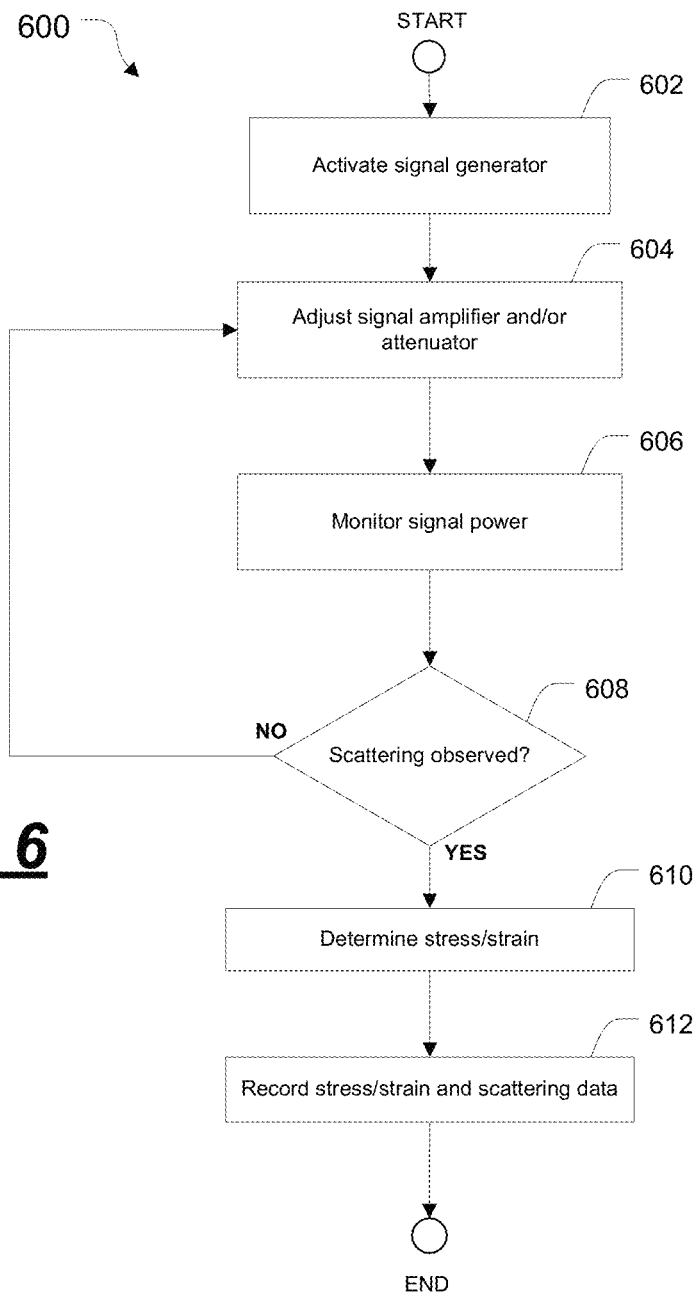
FIG. 6 illustrates a process flow diagram of an exemplary method for determining a stress and/or strain associated with a communication device.

Turning now to FIG. 6, an exemplary process 600 for determining a stress or strain level associated with a media 104, 105, e.g., using test apparatus 400, is shown. Process 600 may begin at block 602, where signal generator 408 is activated. For example, a tunable laser may be activated such that it initiates an optical signal in DUT 402 at a desired wavelength $\omega_0$. Process 600 may then proceed to block 604.

In block 604, signal amplifier 410 and signal attenuator 412 may be adjusted to achieve a desired magnitude of the initiated signal in the DUT 402. Process 600 may then proceed to block 606.

In block 606, the initiated signal and reflected components of the generated signal in the DUT 402 are monitored, e.g., by the monitor 416. In one exemplary illustration, the monitor 416 compares an initiated signal with a reflected portion to observe any Brillouin scattering that may be present in the DUT 402. For example, as described above, monitor 416 may observe a difference between frequency shifts in various portions of a media 104, 105. Process 600 may then proceed to block 608.

In block 608, monitor 416 may determine whether any Brillouin scattering, or any difference in Brillouin scattering that might indicate differences in a stress or strain between various portions of the DUT 402. If no difference in Brillouin scattering is detected in the DUT 402, then process 600 may proceed to step 604. A lack of Brillouin scattering may generally indicate that no stress or strain differences are detected in the DUT 402, and thus process 600 may proceed back to block 604, thereby forming a loop that generally continuously monitors the DUT 402 any shifts in stress and/or strain in a portion of the DUT 402, e.g., as may be evidenced by corresponding changes in observed Brillouin scattering.

If a difference is detected by the monitor 416 in block 608, then process 600 may proceed to block 610, where the stress and/or strain present in the DUT 402 may be determined. In one exemplary illustration, a stress and/or strain of the DUT 402 may be determined from Brillouin scattering observed in the DUT 402 generally in real time. More specifically, known characteristics of DUT 402, e.g., an optical fiber, may be used to determine a stress and/or strain level present in the optical fiber. For example, as described above an observed difference between an incident signal 200 and a reflected portion 200' of the signal 200 received from the DUT 402, e.g., a difference in Brillouin scattering in a portion of the DUT 402, may indicate inelastic deformation of a microstructure associated with the DUT 402. Further, a position of a stressed portion within DUT 402 may be determined, e.g., from a relative delay in the shifted signals observed. The process 600 may thereafter proceed to block 612.

Alternatively, stress and/or strain in the DUT 402 may be determined according to pre-established data regarding Brillouin scattering characteristics of the DUT 402. More specifically, data may be established for DUT 402, e.g., during design and/or construction of a network, e.g., system 100. Monitor 416 may thus compare any Brillouin scattering present within the DUT 402 with known scattering characteristics of similar media to the DUT 402 that may be stored, e.g., in database 418. Accordingly, the monitor 416 may determine a stress associated with the observed Brillouin scattering in the DUT 402 without having to devote resources, e.g., computing power, to directly determining stress and/or strain levels in real time.

Figure 7:
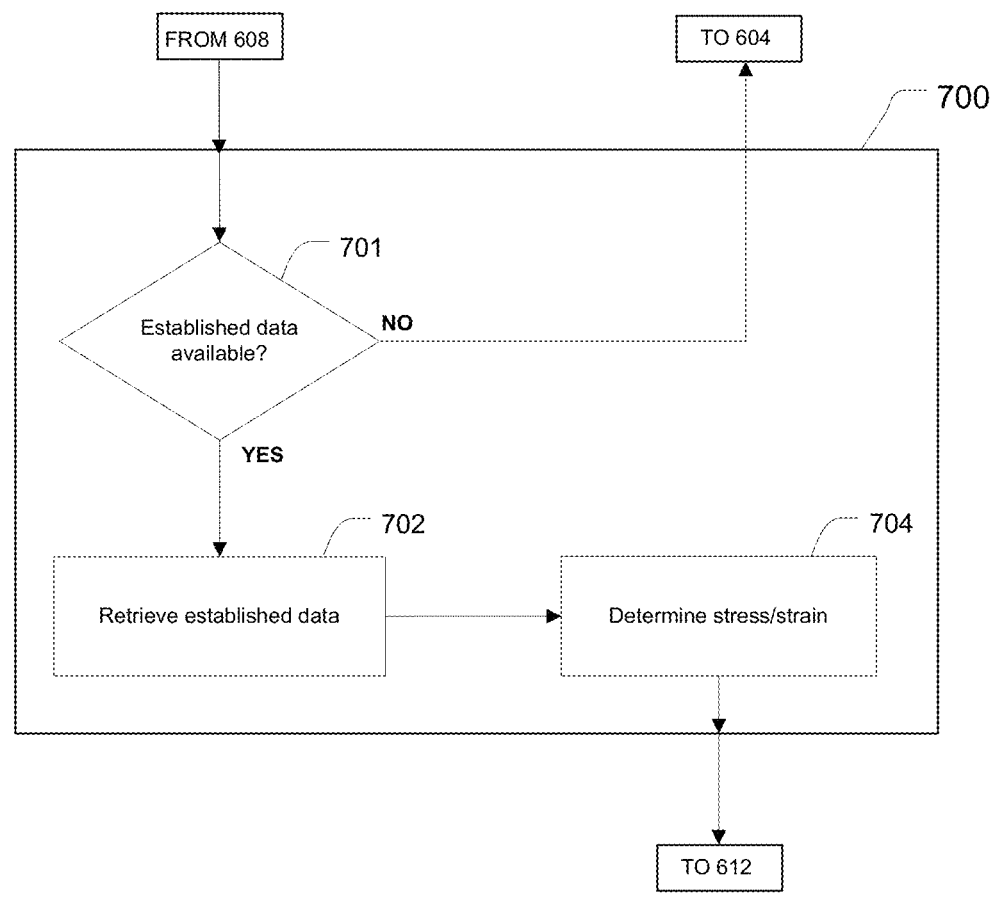
FIG. 7 illustrates a process flow diagram of an exemplary subprocess for determining a stress and/or strain associated with a communication device.

Turning now to FIG. 7, one exemplary illustration of a subprocess 700 for determining stress and/or strain of a DUT 402, e.g., as an alternative to block 610, is illustrated. At block 701, the subprocess 700 may query whether there is any established data available that is relevant to the observed Brillouin scattering. For example, the subprocess 700 may query database 418 to determine if there is a match to the Brillouin scattering being observed in the DUT 402 present in the database 418. If no data is established, subprocess 700 may proceed back to block 604, where the amplifier and attenuator may be adjusted to initiate a different signal in the DUT 402, e.g., at a different frequency, power, etc. in order to initiate a different Brillouin scattering effect in an attempt to match the observed Brillouin scattering with any known or established data.

If there is established data that is relevant, e.g., the Brillouin scattering observed in the DUT 402 matches or otherwise corresponds to a known stress and/or strain level in the DUT 402, then subprocess 700 may proceed to block 702. In block 702, the established data may be retrieved, e.g., from database 418. Proceeding to block 704, a stress and/or strain present in the DUT 402 may be determined from the established data. For example, if the Brillouin scattering observed in the DUT 402 corresponds to or matches established data that is known to result from a given stress or strain level, then the subprocess 700 may determine that the given stress or strain level is present in the DUR 402. The subprocess 700 may then proceed to block 612.

Proceeding to block 612, the signal present in the DUT 402 may be recorded. For example, the observed Brillouin scattering and signal characteristics, e.g., input/output power, wavelength, etc., may be stored in database 418 for future use in determining stress/strain in a device. Accordingly, in examples where monitor 416 relies at least in part upon pre-existing or established data to determine stress and/or strain levels present in DUT 402, the monitor 416 may generally increase a known dataset present in the database 418 with each measurement taken.

The exemplary systems and methods described herein may allow for diagnosing potential problems in communication systems before signal transmission losses become significant, e.g., due to total failure of a signal transmission element such as an optical fiber. Further, structural elements may be monitored using exemplary media, e.g., optical fibers, allowing greater ease of diagnosing potential structural defects where the structure itself or a location of the structure presents difficulties in doing so.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
    establishing data associated with a plurality of communication devices, the data including a plurality of comparisons for the plurality of communication devices of initiated signals and reflected signals for a corresponding plurality of stress magnitudes observed in the plurality of devices;
    transmitting an initiated signal through a test communication device;
    comparing a reflected signal with the initiated signal to determine a test device comparison, the reflected signal reflected by the portion of the test communication device, wherein the test device comparison is determined after establishing the data associated with the plurality of communication devices; and determining a magnitude of a stress associated with the test device by comparing the test device comparison to the data associated with the plurality of communication devices.

2. The method of claim 1, further comprising determining a position of the stress along a length defined by the device.

3. The method of claim 1, wherein the magnitude of the stress is determined from at least a frequency shift associated with the reflected signal.

4. The method of claim 3, further comprising determining a frequency shift difference between a first frequency shift associated with a first portion of the communication device and a second frequency shift associated with a second portion of the communication device; and establishing the magnitude of the stress as being determined according to at least the frequency shift difference.

5. The method of claim 3, further comprising establishing the communication device as being housed within a structure; and establishing the stress as indicating a structure stress associated with the structure.

6. The method of claim 1, wherein the stress is associated with an inelastic distortion in a lattice structure of the device.

7. The method of claim 1, further comprising establishing the device as being formed of a light-transmitting material.

8. The method of claim 7, further comprising establishing the device as an optical fiber.

9. The method of claim 1, further comprising establishing the initiated signal as an optical signal.

10. The method of claim 9, further comprising establishing the reflected signal as including an optical component and a vibrational component.

11. The method of claim 1, further comprising establishing the initiated signal as including a first photon, and the reflected signal as including a reflected photon and a phonon.

12. The method of claim 11, further comprising establishing the comparison of the initiated signal and the reflected signal as a comparison of a first frequency associated with the first photon with a reflected frequency associated with the reflected photon.

13. The method of claim 1, further comprising adjusting the stress in the communication device; and comparing a change in the reflected signal with a stress associated with the device, the stress associated with the device and included in the data.

14. A method, comprising:

establishing data associated with a plurality of communication devices, the data including a plurality of comparisons for the plurality of communication devices of initiated signals and reflected signals for a corresponding plurality of stress magnitudes observed in the plurality of devices;

transmitting an initiated signal through a test communication device;

comparing a reflected signal with the initiated signal to determine a test device comparison, the reflected signal reflected by the portion of the test communication device, wherein the test device comparison is determined after establishing the data associated with the plurality of communication devices; and determining a magnitude of a stress associated with the test device by comparing the test device comparison to the data associated with the plurality of communication devices:

determining a frequency shift difference between a first frequency shift associated with a first portion of the communication device and a second frequency shift associated with a second portion of the communication device; and establishing the stress as being determined according to at least the frequency shift difference; and establishing the communication device as being housed within a structure; and establishing the stress as indicating a structure stress associated with the structure.

15. The method of claim 14, further comprising establishing the device as an optical fiber.

16. A system, comprising:

a signal transmitter in communication with a test communication device, the transmitter configured to initiate a signal through the communication device;

a receiver in communication with the communication device, the receiver configured to receive a reflected signal from the communication device;

a monitor configured to compare the initiated signal and the reflected signal to determine a test device comparison including at least a frequency shift associated with the initiated signal and the reflected signal; and a data store including pre-established data associated with a plurality of communication devices, the data including a plurality of comparisons for the plurality of communication devices of initiated signals and reflected signals for a corresponding plurality of stress magnitudes observed in the plurality of devices;

wherein the monitor is configured to determine a magnitude of a stress associated with the test device by comparing the test device comparison to the data associated with the plurality of communication devices.

17. The system of claim 16, wherein the monitor is configured to determine a frequency shift difference between a first frequency shift associated with a first portion of the communication device and a second frequency shift associated with a second portion of the communication device; and wherein the stress is determined according to at least the frequency shift difference.

18. The system of claim 16, further comprising a housing enclosing the communication device and defining a structural stress imparted upon the communication device, wherein the stress in the communication device is directly related to the structural stress.

19. The system of claim 16, wherein the stress is associated with a distortion in a lattice structure of the device.

20. The system of claim 16, wherein the device is an optical fiber.

21. The method of claim 1, further comprising determining a lack of a match between the test device comparison and the data, and adjusting the initiated signal to match the data associated with the test device.

22. The method of claim 21, wherein the magnitude of the stress is determined from at least a reflected signal resulting from the adjusted initiated signal.

* * * * *